United States Patent
Nijboer et al.

(10) Patent No.: US 6,930,966 B2
(45) Date of Patent: Aug. 16, 2005

(54) METHOD OF HIDING AREAS ON A DISC LIKE RECORDING OF THE OPTICALLY REWRITABLE TYPE

(75) Inventors: Jakob G. Nijboer, Eindhoven (NL); Jacobus P. J. Heemskerk, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 10/761,025

(22) Filed: Jan. 20, 2004

(65) Prior Publication Data

US 2004/0151095 A1 Aug. 5, 2004

Related U.S. Application Data

(63) Continuation of application No. 09/685,553, filed on Oct. 10, 2000, now Pat. No. 6,704,263.

(30) Foreign Application Priority Data

Oct. 13, 1999 (EP) .............................................. 99203332
Dec. 3, 1999 (EP) .............................................. 99204120

(51) Int. Cl.$^7$ ................................................ G11B 7/00
(52) U.S. Cl. ............................... 369/53.21; 369/275.3; 369/47.53
(58) Field of Search ......................... 369/47.11, 53.21, 369/47.27, 47.36, 47.39, 47.22, 275.3, 47.53

(56) References Cited

U.S. PATENT DOCUMENTS

| | | | |
|---|---|---|---|
| 4,999,825 A | | 3/1991 | Raaymakers et al. |
| 5,226,027 A | * | 7/1993 | Bakx ............................ 369/50 |
| 5,305,296 A | * | 4/1994 | Kono ........................... 369/50 |
| 6,411,574 B1 | * | 6/2002 | Su et al. .................. 369/47.11 |

\* cited by examiner

*Primary Examiner*—Nabil Hindi
(74) *Attorney, Agent, or Firm*—Edward W. Goodman

(57) ABSTRACT

A next generation of high-speed CD-RW discs for high-speed recording (4x–10x) needs a new write strategy, which is not suited for recording at lower speeds (1x–4x). Existing CD-RW recorders may accept these discs and make recordings according to existing write strategies. This will result in unreadable discs. To prevent this, a Power Calibration Area (PCA) and a Program Memory Area (PMA), both needed for recording, are hidden for the existing recorders. As a result the disc will be rejected. In a method wherein an absolute time reference (ATIP) is applied on the disc, the start locations of these areas being determined by a fixed time offset relative to a subsequent Lead-in area, the PCA and PMA are made untraceable by introducing and Absolute Time in Pre-Groove (ATIP) time code jump of, for instance, one minute just before the Start time of the Lead-in area. Alternatively, the absolute Time in Pre-Groove (ATIP) time code jumps are introduced between a Test Area and a Count Area of the program calibration area (PCA).

17 Claims, 5 Drawing Sheets

METHOD OF HIDING AREAS ON A DISC LIKE RECORDING OF THE OPTICALLY REWRITABLE TYPE

CROSS-REFERENCE TO RELATED APPLICATIONS

This is a continuation of U.S. patent application Ser. No. 09/685,553, filed Oct. 10, 2000, now U.S. Pat. No. 6,704,263.

BACKGROUND OF THE INVENTION

1. Field of the Invention

The invention relates to a method of preventing recording on a disc-like recording medium of the optically rewritable type, the method comprising applying a pre-groove on the disc-like recording medium adapted to write data therein in accordance with a first write strategy, reserving a program calibration area (PCA) for optimum power control (OPC) and/or a program memory area (PMA) for temporarily storing a table of content (TOC) on said disc-like recording medium.

The invention further relates to a recording apparatus adapted for recording digital information signals on a disc-like recording medium of the optically rewritable type, said apparatus comprising input means for receiving digital information signals, encoding means for coding the received digital information signals for recording on the disc-like recording medium, writing means for writing optically detectable marks representing the encoded information signals on the disc-like recording medium in accordance with a first write strategy, address determining means for locating, on the disc-like recording medium, a program calibration area (PCA) to be used for a optimum power control (OPC) procedure, and/or a program memory area (PMA) to be used for temporarily storing a table of content (TOC).

The invention also relates to a disc-like recording medium of the optically rewritable type having a pre-groove adapted to record data therein in accordance with a first write strategy, a Program Calibration Area (PCA) adapted to be used in a Optimum Power Control (OPC) procedure and/or, a Program Memory Area (PMA) adapted to temporarily store a table of content (TOC).

2. Description of the Related Art

A disc-like recording medium of the optically type is disclosed, for instance, in European Patent No. 390 268 (PHN13148), which is incorporated herein by reference. Such a disc which allows recording apart from playback may be referred to as a CD-Recordable (CD-R), a CD-Erasable (CD-E) or a CD-Rewritable (CD-RW).

As the name implies, CD-RW is a media and recording system that allows the user to erase previously recorded information and then to record new information in its place, making short-term storage feasible on CD media. This is accomplished by means of a new CD-RW media using "phase change" technology that allows a recording laser beam to change the media material from amorphic to crystalline by means of a shift in power.

The first generation of CD-RW discs are designed for speed applications covering a range of 1 times–4 times the nominal speed of a conventional CD-ROM disc, being approximately 150 kbs. The next generation CD-RW discs however will designed for high-speed applications ranging from 4 times–10 times this nominal speed. Because of the typical behavior of phase change materials, these discs need a new write strategy, which is not suited for recording at lower speeds. Furthermore, the existing write strategies defined for 1X, 2X and 4X recording speed, do not work on these new discs.

Some of the existing CD-RW recorders, designated to operate with the lower speed ranges, are recognizing the new high-speed discs and reject them. But others will accept these discs and make recordings on them according to one of the existing write strategies, for instance default at 2X speed. These recordings will result in unreadable signals, thereby destroying previously recorded information.

SUMMARY OF THE INVENTION

It is an object of the invention to obviate the above-mentioned disadvantages. According to one aspect, a method according to the invention is characterized by making one or both of said areas untraceable for recording devices adapted to write data on a disc-like recording medium in accordance with a second, different write strategy.

As both areas are needed by a recorder, hiding these areas for existing recorders, designed to operate with low speeds, will result in rejecting of the disc.

In a method comprising applying absolute time reference (ATIP) information in the pre-groove on the disc-like recording medium in which start locations of said areas are being determined by a fixed time offset relative to a subsequent Lead-in area, an advantageous embodiment thereof is characterized by introducing an ATIP time code jump to ATIP time codes before the start of the Lead-in area. The Pre-Groove of a CD-RW disc contains an Absolute Time Reference in the Pre-Groove. As the locations of the PCA and PMA areas are determined by a fixed offset relative to the Start time of the Lead-in areas, these areas are made/untraceable.

Further advantageous embodiments of a method according to the invention are disclosed in the description, as well as embodiments of a disc-like recording medium and recording apparatus according to the invention.

BRIEF DESCRIPTION OF THE DRAWINGS

These and further aspects and advantages of the invention will be discussed in more detail hereinafter with reference to the disclosure of preferred embodiments, and in particular, with reference to the drawings, in which.

DESCRIPTION OF THE PREFERRED EMBODIMENTS

In a CD-RW, there are two areas preceding the Lead-in area that are reserved for use by the recorder. The Power Calibration Area (PCA) is intended for making test recordings to determine the optimal write power for the actual disc. Every time a disc is inserted into a CD-RW drive, the laser is fired at the surface of the PCA to judge the optimum power setting for burning the CD. Various things can influence this optimum setting—the recording speed, humidity, ambient temperature and the type of disc being used. The Program Memory Area (PMA) is intended to store a temporary Table of Content (TOC). A TOC contains track numbers and their start and stop times (for music), or sector address for the start of data files on a data CD.

The Information Area, i.e., the area of the disc which contains data, is divided into three areas, notably, the Lead-in area, the Program Area and the Lead-out area. The Lead-in area contains digital silence in the main channel plus the Table of Contents (TOC) in the subcode Q-channel. The Lead-in area allows the laser pickup head to follow the pits and synchronize to the audio or computer data before the start of the program area. The Program Area contains up to about 76 minutes of data divided into 99 tracks maximum. The Lead-out area contains digital silence or zero data. This defines the end of the CD program area.

Both PCA and PMA areas are needed by the recorder. As such, if they can be hidden from existing recorders for low application speeds, these recorders cannot perform an Optimum Power Control (OPC) procedure and cannot read the temporary TOC. As a result, these recorders will reject the disc.

Figure 1:
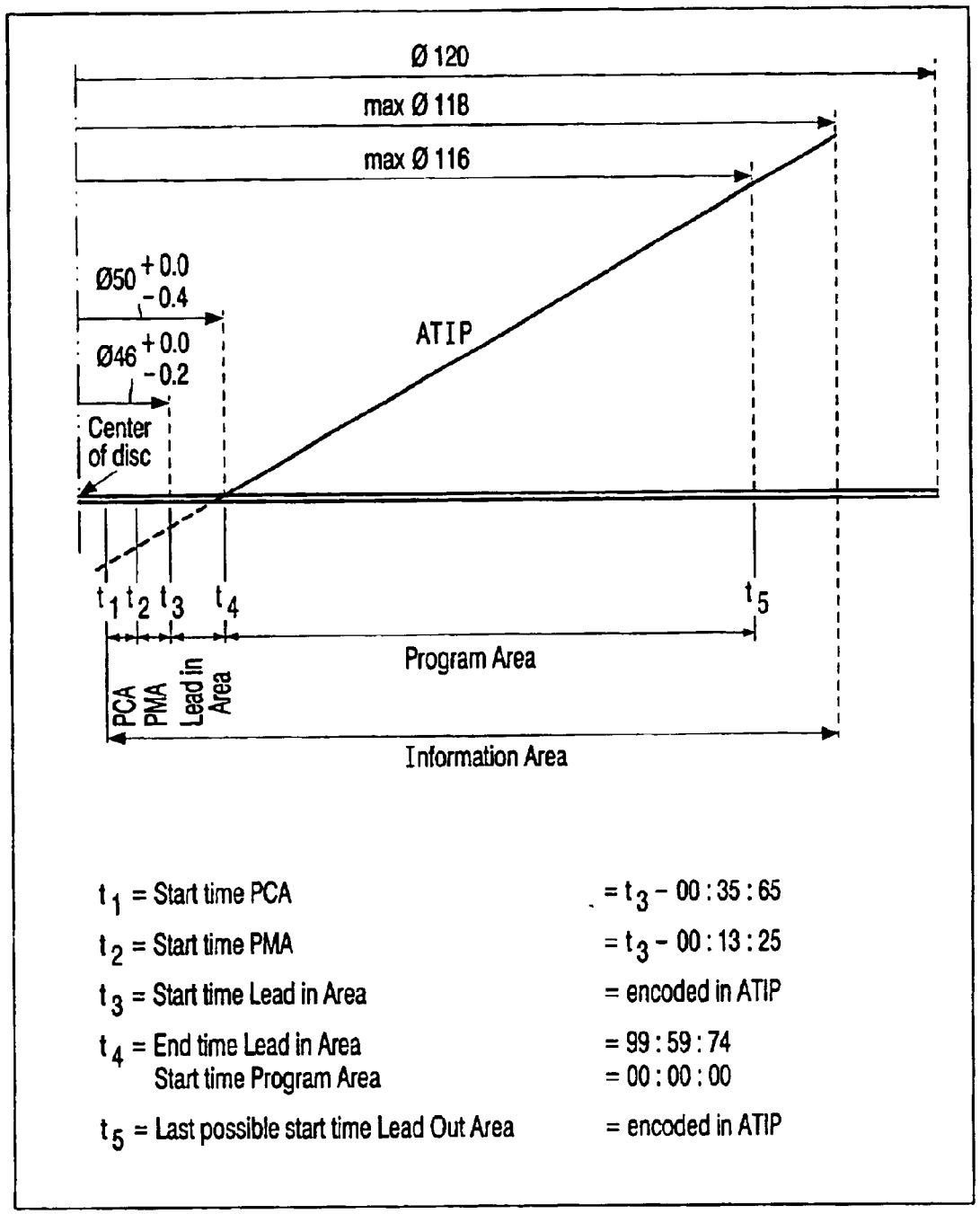
FIG. 1 is a chart showing an existing ATIP versus disc diameter.

The locations of the PCA and PMA areas are determined by a fixed time offset relative to the Start time of the Lead-in area, as illustrated in FIG. 1

Figure 2:
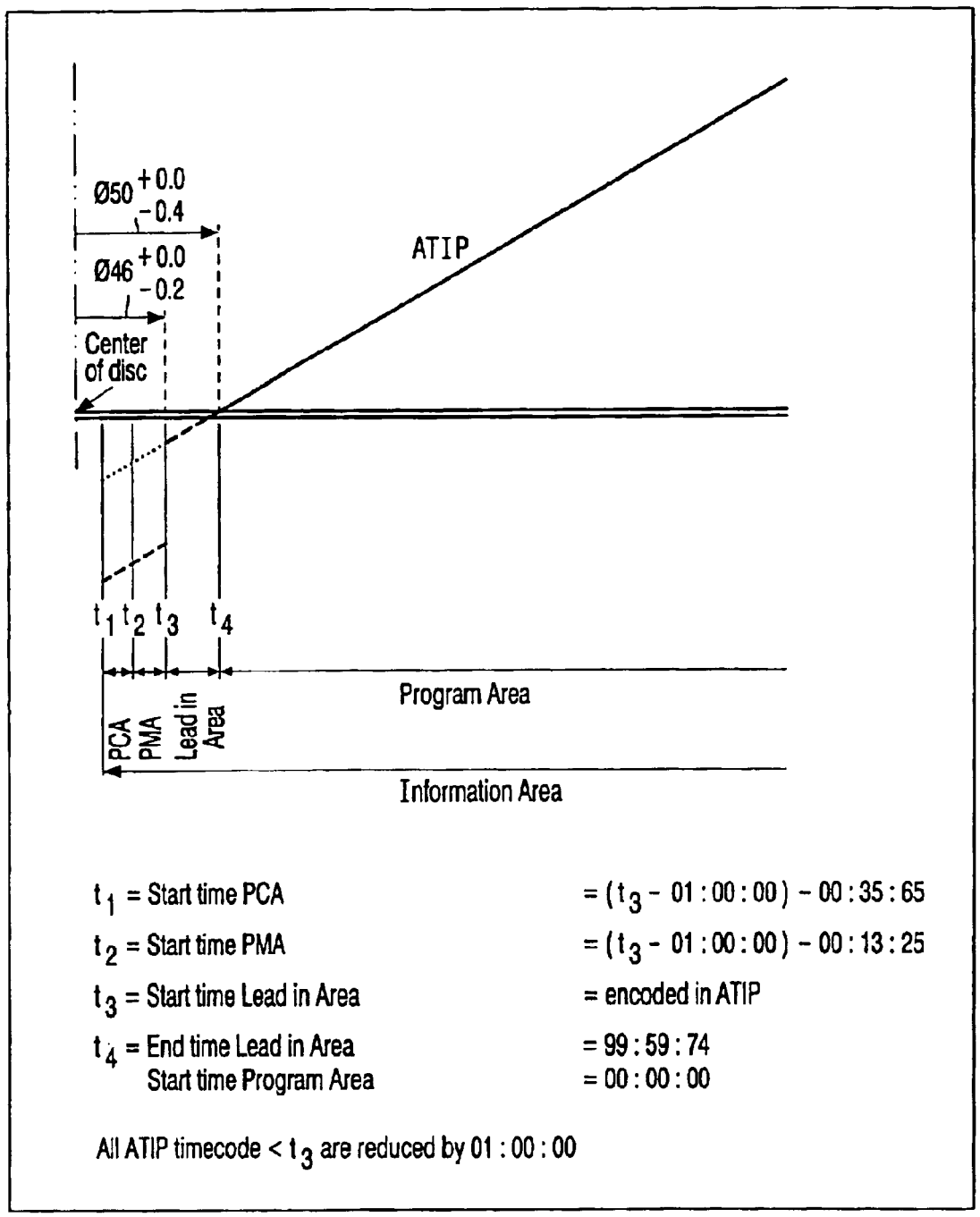
FIG. 2 is a chart showing a modified ATIP versus disc diameter, modified according to a first embodiment of the invention.

On the new generation of high speed discs, the PCA and PMA could be made untraceable, according to a first embodiment of the invention, for existing drives by introducing an ATIP time code jump of, for instance, 1 minute just before the Start time of the Lead-in area. In other words, all ATIP time codes up to the Start time of the Lead-in area are reduced by one minute, as illustrated in FIG. 2.

Existing drives cannot distinguish between old and new discs and, therefore, will search for an ATIP time code (t3-00:35:65) or (t3-00:13:25) to find the PCA or the PMA, respectively, which they find on old discs, but never find on new discs. As a result they will reject the new discs.

New drives or upgraded drives adapted to operate with high speed discs at higher speed applications, can recognize the new discs and know about the existence of the ATIP time code jump, and will search for (t3-01:00:00–00:35:65) or (t3-01:00:00–00:13:25) to find the PCA or the PMA, respectively, on new discs.

Figure 3:
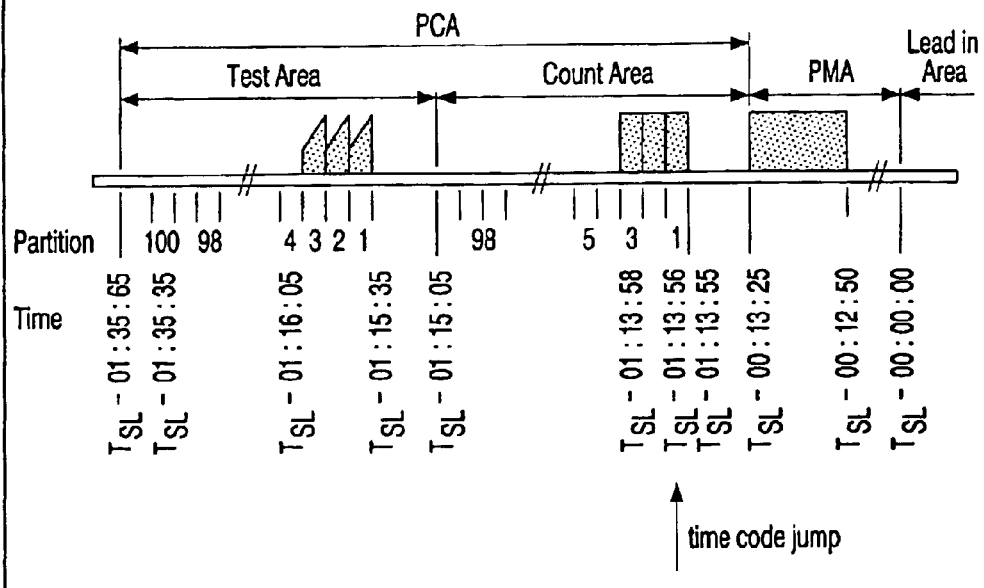
FIG. 3 is a chart showing the-detailed organization of the PCA, PMA and Lead-in area of FIG. 2, modified according to a second embodiment of the invention.

However, because some recorders are using the PMA also for access during playback, an advantageous second embodiment leaves the PMA untouched. In order to achieve this, the ATIP Time Code jump is chosen as illustrated with reference to FIG. 3. To have some buffer area before the PMA, which might be useful for good access control, the time code jump could possibly be better located just after the last used frame of the count area in the PCA as illustrated in FIG. 3. Herein, $T_{SL}=t_3=$Start time Lead-in.

Figure 4:
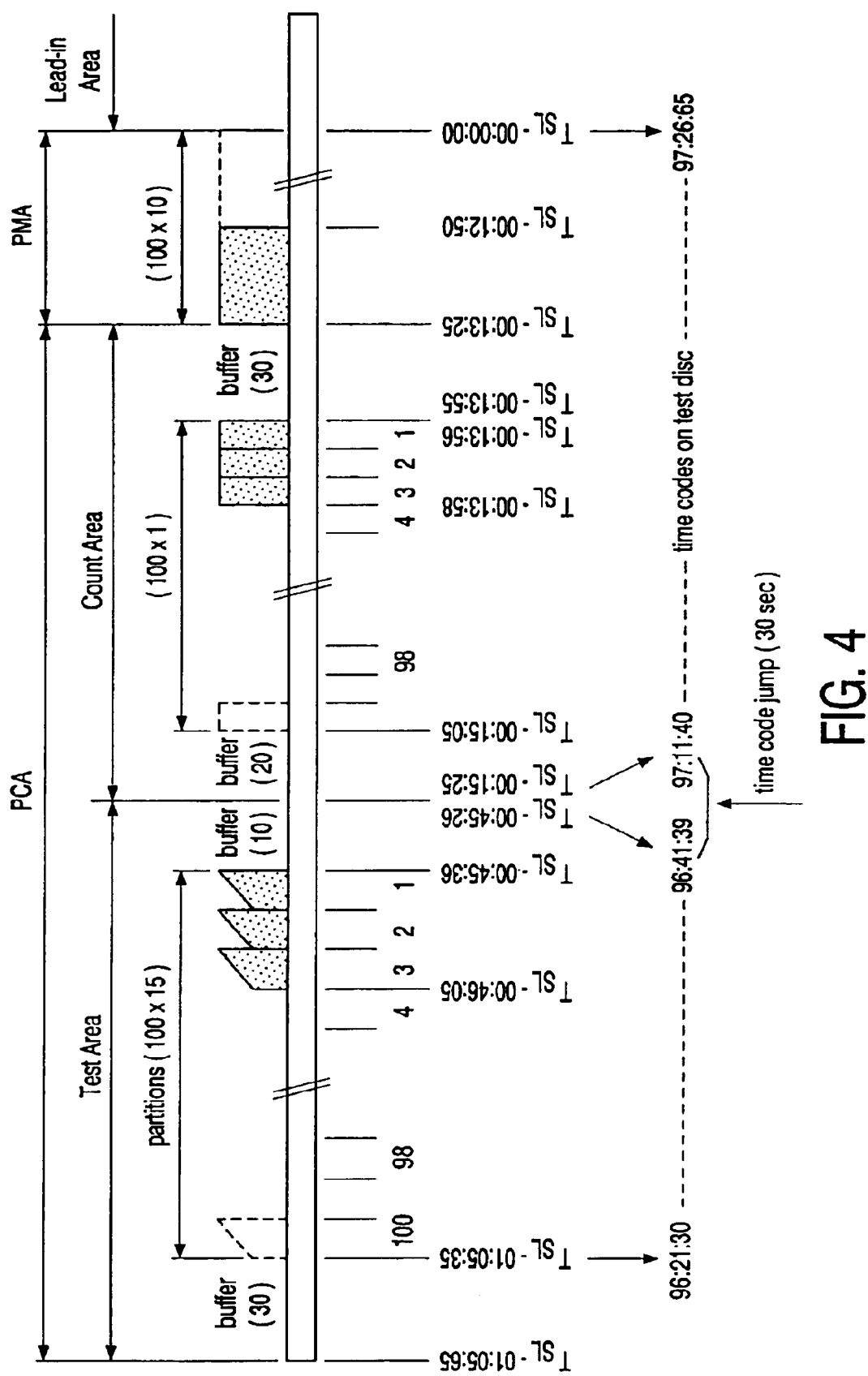
FIG. 4 is a chart showing a modified ATIP versus disc diameter, modified according to a third, preferred embodiment of the invention.

FIG. 4 shows a preferred third embodiment according to the invention. As shown in FIG. 4, the power calibration area PCA is divided into two areas. A first area is a Test Area, in which tests can be performed to obtain correct reading power for a disc. A second area is a Count Area, where it can be read which part of the Test Area can be used. Both areas of the PCA are divided into partitions, which must be used in sequential order, starting from partition number one. The PCA can be used many times, i.e., once all partitions have been used, the total PCA must be erased, after which it is available for the next sequence of power calibration procedures. The ATIP jump location is, with respect to the embodiments shown in FIG. 2 and FIG. 3, shifted into the buffer area between the PCA Test Area and the PCA Count Area. This results in a distance between the ATIP jump and the PMA area of 2 minutes. This gives the advantage of more space for drives to access the PMA. As some drives may employ the Program Memory Area (PMA), the available free space or buffer area may be insufficient for the use as explained with reference to FIG. 2 and FIG. 3. It is noted that drives expect PCA Test partitions from 96:51:30 to 97:11:29.

Figure 5:
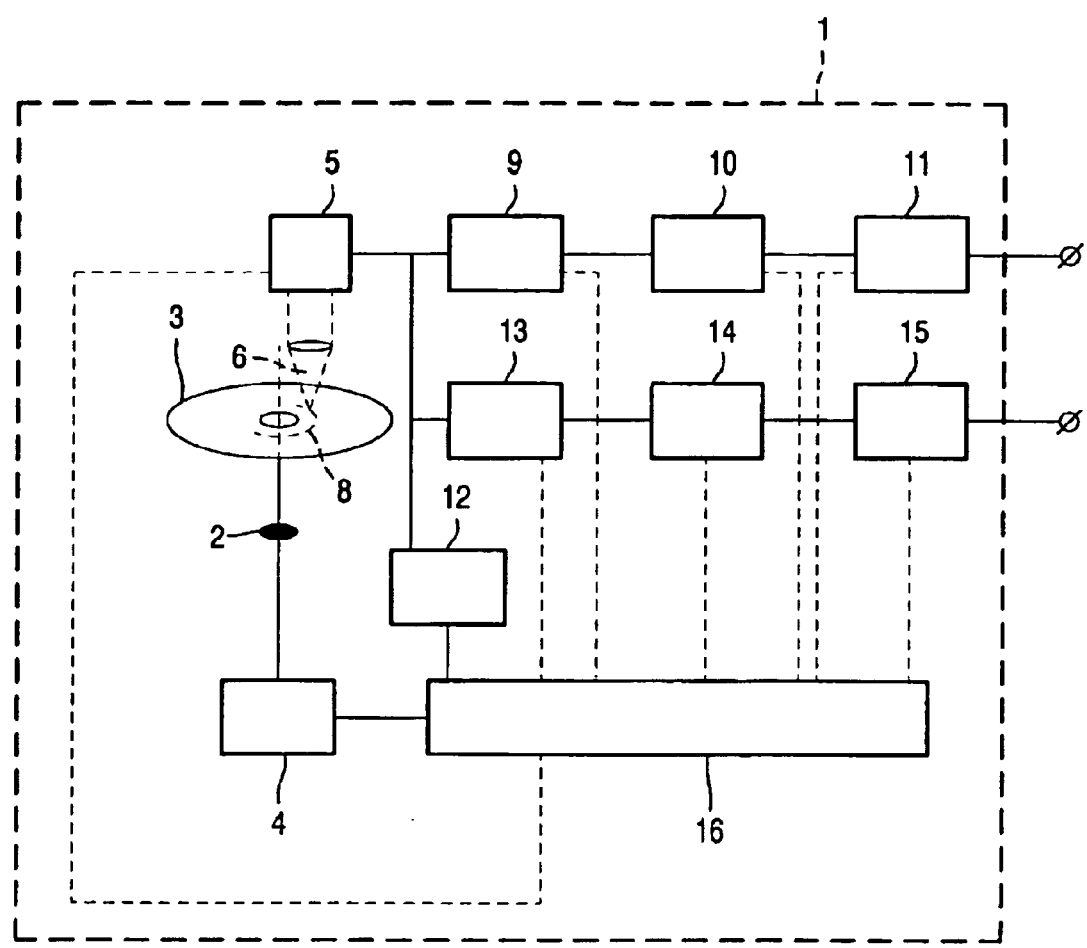
FIG. 5 shows a schematic block diagram of a recording apparatus according to an embodiment of the invention.

Next an embodiment of a recording apparatus according to the invention will be described, with reference to FIG. 5. The recording apparatus 1 comprises recording medium receiving means 2 for receiving a removable recording medium 3. The recording medium 3 may be a disc of the optically rewritable type, such as CD-RW, DVD-RAM or DVD-RW. The recording medium 3 is rotationally driven by rotation means 4. An optical pick-up unit 5, movable in a radial direction of the recording medium 3, writes optically detectable marks along a spiral track 8 on the recording medium 3 employing a light beam 6. To this end, the recording medium 3 is provided with a suitable phase-change material which has different optical properties in crystalline or amorphous states. Heating with the light beam 6 may induce these states. The light beam 6 is modulated by recording means 9 according to digital information signals to be recorded. These digital information signals have been suitable encoded by encoding means 10, employing EFM modulation and CIRC error encoding, as prescribed by the CD-standards. Input means 11, which may comprise A/D conversion means and/or special interface circuitry, may receive analog and/or digital information signals.

Alternatively, recorded digital information signals on the recording medium 3, may be read via the same optical pick-up unit 5, by suitable reading means 13. The reading means 13 is connected to decoding means 14 for performing EFM decoding and CIRC error correction processing. The decoded and corrected signals are outputted, via outputting means 15, which may comprise D/A means and/or suitable interface circuitry, digital and/or analog information signals.

In addition, address finding means 12 is provided to determine address information present on the recording medium 3. Such address information, for example, in the form of absolute time codes, may be recorded in the track 8 by means of a pre-formed track modulation as disclosed in European Patent No. 390 268 (PHN 13148). Such a track is described in more detail in the Dutch Patent Application NL-A-8800152, corresponding to U.S. Pat. No. 4,999,825 (PHN 12399). The address finding means 12 derives an address signal from the signal components in the detection signals which are caused by the pre-formed track modulation. The address signal is supplied to the controlling unit 16.

All units are controlled by the controlling unit 16. The controlling unit 16 may comprise a processing unit which operates according to a specific program loaded in memory means, in order to perform the method according to the invention.

Specifically, the controlling unit 16 comprises information relating to the time jump in the Absolute Time Reference (ATIP) as may be present in the recording medium 3, as described before. This enables the recording apparatus 1 to locate the previously-mentioned areas on a recording medium 3 to be used for an Optimum Power Control (OPC) procedure and/or recording of a temporary table of content (TOC).

Although the invention has been described with reference to a preferred embodiment thereof, it is to be understood that these are not limitative example. Thus, various modifications thereof may become apparent to those skilled in the art, without departing from the scope of the invention, as defined by the claims. The invention may be implemented by means of both hardware and software, and that several "means" may be represented by the same item of hardware. Further, the invention lies in each and every novel feature or combination of features. It is also remarked that the word "comprising" does not exclude the presence of other elements or steps than those listed in a claim. Any reference signs do not limit the scope of the claims.

What is claimed is:

1. A method of preventing recording on a disc-like recording medium of the optically rewritable type by recording devices adapted to write data on a disc-like recording medium in accordance with a second write strategy, the method comprising the steps of:

applying a pre-groove on a disc-like recording medium adapted to have data recorded therein in accordance with a first write strategy, different from said second write strategy;

reserving a program calibration area (PCA) for optimum power control (OPC) and/or a program memory area (PMA) for temporarily storing a table of content (TOC) on said disc-like recording medium; and making one or both of said areas untraceable for recording devices adapted to write data on a disc-like recording medium in accordance with said second write strategy.

2. The method as claimed in claim 1, wherein said step of making one or both of said areas untraceable comprises the steps of:

applying absolute time reference (ATIP) information in the pre-groove on the disc-like recording medium, start locations of both areas are being determined by a fixed time offset relative to a subsequent Lead-in area; and introducing an ATIP time code jump to ATIP time codes before the start of the Lead-in area.

3. The method as claimed in claim 2, characterized in that said introducing step comprises:

reducing all ATIP time codes up to the start time of the Lead-in area by approximately one minute.

4. The method as claimed in claim 2, wherein said method further comprises the step:

dividing the program calibration area (PCA) in a program calibration Test Area and a program calibration Count area, and wherein said introducing step comprises:

introducing an ATIP time code jump between the program calibration Test Area and the program calibration Count Area.

5. The method as claimed in claim 2, characterized in that said introducing step comprises:

reducing all ATIP time codes up to the last used area in the PCA.

6. A disc-like recording medium of the optically rewritable type, the recording medium comprising:

a pre-groove adapted to have data recorded therein in accordance with a first write strategy;

a Program Calibration Area (PCA) adapted to be used in a Optimum Power Control (OPC) procedure; and/or a Program Memory Area (PMA) adapted to temporarily store a table of content (TOC), wherein at least one of said areas is untraceable for recording devices adapted to record data on the disc like recording medium in accordance with a second write strategy different from said first write strategy.

7. The disc-like recording medium as claimed in claim 6, wherein said disc-like recording medium further comprises:

time codes, representing Absolute Time Reference Information (ATIP), in the pre-groove in which a start location of at least one of said areas is determined by a fixed time offset relative to a subsequent Lead-in area, and wherein the time codes before the start of the Lead-in area comprise a time jump of the Absolute Time Reference (ATIP).

8. The disc-like recording medium as claimed in claim 7, characterized in that, all time codes up to approximately the start time of the Lead-in area comprise a reduction of the Absolute Time Reference (ATIP) by approximately one minute.

9. The disc-like recording medium as claimed in claim 7, wherein the Program Calibration Area (PCA) is divided in a Program Calibration Test Area and a Program Calibration Count Area, characterized in that the time codes between the Program Calibration Test Area and the Program Calibration Count Area comprise a time jump of the Absolute Time Reference (ATIP).

10. The disc-like recording medium as claimed in claim 7, characterized in that all time codes up to a last used Rearea in the Program Calibration Area have a reduced Absolute Time Reference (ATIP).

11. The disc-like recording medium as claimed in claim 7, characterized in that, the disc-like recording medium is a Compact Disc-Rewritable (CD-RW).

12. A recording apparatus for recording digital information signals on a disc-like recording medium of the optically rewritable type, comprising:

input means for receiving digital information signals;

encoding means for encoding the received digital information signals for recording on the disc-like recording medium;

writing means for writing optically detectable marks representing the encoded information signals on the disc-like recording medium in accordance with at least a first write strategy;

address determining means for locating, on the disc-like recording medium, a Program Calibration Area (PCA) to be used for a Optimum Power Control (OPC) procedure and/or a Program Memory Area (PMA) to be used to temporarily store a table of content (TOC), said address determining means locating at least one of said areas of a disc-like recording medium where said at least one area is untraceable for recording apparatuses adapted to record data on the disc like recording medium in accordance with a second write strategy different from said first writing strategy.

13. The recording apparatus as claimed in claim 12, wherein the address determining means reads a time code recorded in a pre-groove on a disc-like recording medium representing Absolute Address Information (ATIP) in which a start location of at least one of said areas is determined by a fixed time offset relative to a subsequent Lead-in area on said disc like recording medium, and wherein the address determining means comprises information related to a time jump in the time codes of the Absolute Time Reference before the start of the Lead-in area.

14. The recording apparatus as claimed in claim 13, characterized in that the address determining means comprises information related to a reduction of the Absolute Time Reference (ATIP) in all time codes up to approximately the start time of the Lead-in area.

15. The recording apparatus as claimed in claim 13, characterized in that the address determining means comprises information related to a time code jump of the Absolute Time Reference (ATIP) in the time codes between a Program Calibration Test Area and a Program Calibration Count Area in the Program Calibration Area (PCA).

16. The recording apparatus as claimed in claim 13, characterized in that the address determining means comprises information related to all time codes up to a last used area in the Program Calibration area having a reduced Absolute Time Reference (ATIP).

17. Recording apparatus according to claim 13, characterized in that the recording apparatus handles a Compact Disc-Rewritable (CD-RW) as a disc-like recording medium.

* * * * *